United States Patent [19]

Thompson et al.

[11] Patent Number: 4,648,551

[45] Date of Patent: Mar. 10, 1987

[54] ADAPTIVE BLOWER MOTOR CONTROLLER

[75] Inventors: Kevin D. Thompson; Gary W. Ballard, both of Indianapolis; Robert M. Mamot, Plainfield, all of Ind.

[73] Assignee: Carrier Corporation, Syracuse, N.Y.

[21] Appl. No.: 877,613

[22] Filed: Jun. 23, 1986

[51] Int. Cl.$^4$ ............................................. F24F 7/00
[52] U.S. Cl. ............................... 236/49; 236/DIG. 9; 165/40
[58] Field of Search ................... 236/49, 11, DIG. 9; 62/177, 186, 89, 158; 165/16, 40; 364/148, 557, 551, 565

[56] References Cited

U.S. PATENT DOCUMENTS

| | | | |
|---|---|---|---|
| 3,912,162 | 10/1975 | Bauer et al. | 236/11 |
| 4,090,663 | 5/1978 | Bonne et al. | 165/40 X |
| 4,370,605 | 1/1983 | Breznican | 62/158 |
| 4,406,397 | 9/1983 | Kamata et al. | 236/DIG. 9 |
| 4,549,601 | 10/1985 | Wellmann et al. | 236/49 X |

Primary Examiner—Harry B. Tanner
Attorney, Agent, or Firm—David J. Zobkiw

[57] ABSTRACT

An adaptive motor control for a furnace with or without an evaporator coil determines and delivers the desired CFM for each thermostat cycle. Specifically, a circulating air blower driven by an ECM is initially set at a known duty cycle for each thermostat cycle and the delivered CFM is calculated. The RPM necessary to deliver the desired CFM is then determined and the ECM is set accordingly.

2 Claims, 6 Drawing Figures

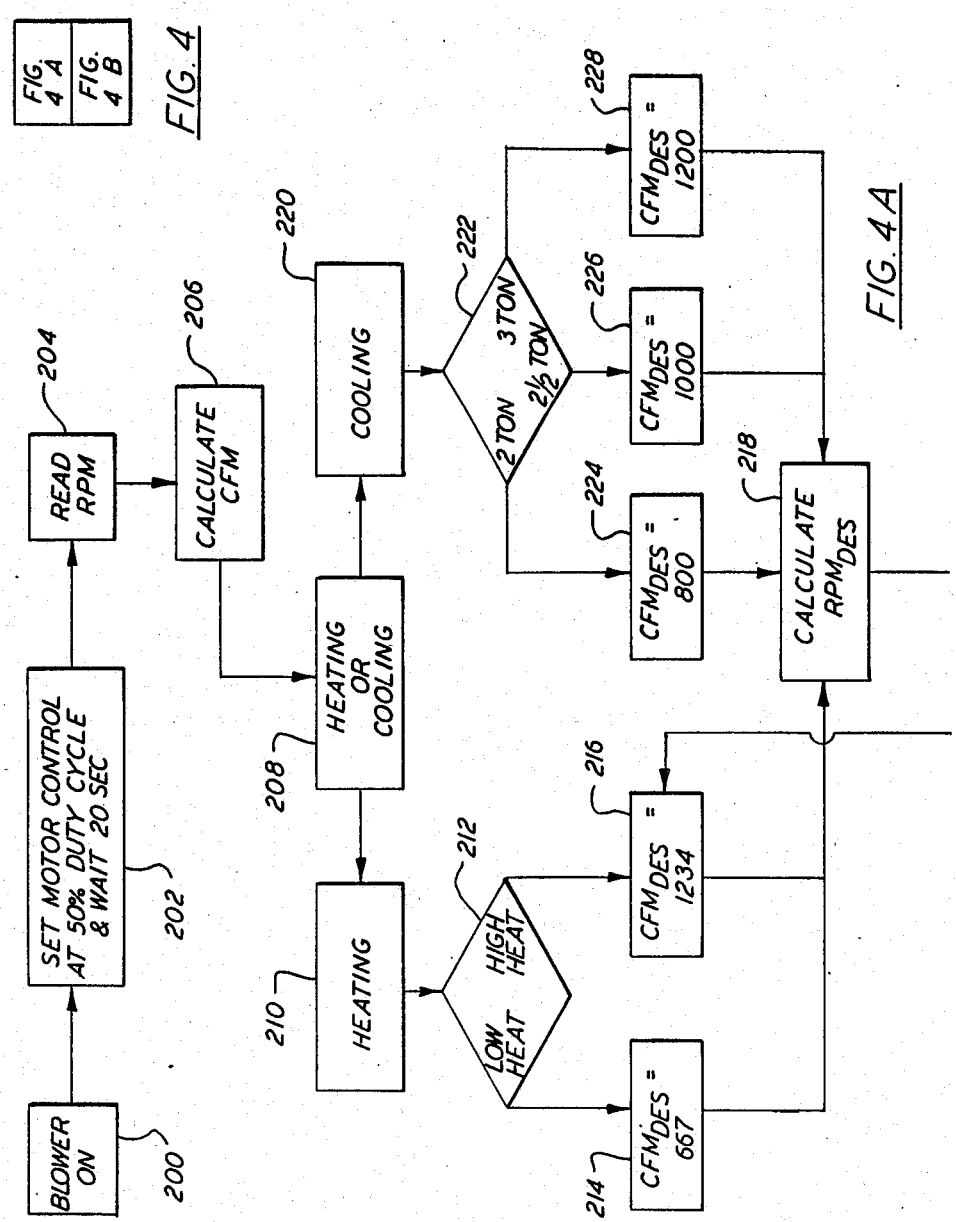

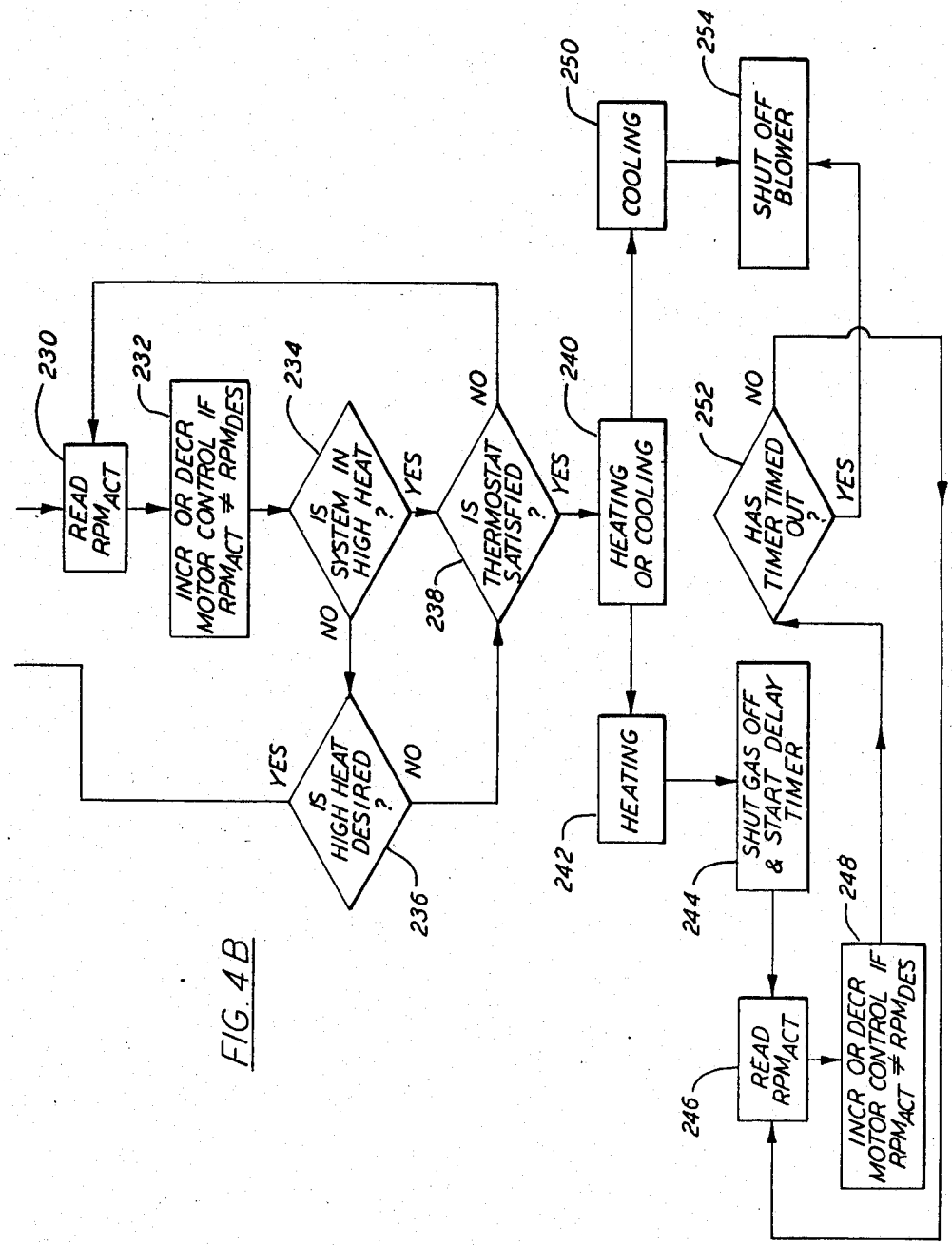

ADAPTIVE BLOWER MOTOR CONTROLLER

BACKGROUND OF THE INVENTION

Tapped winding circulating air blower motors are used for air delivery in furnaces and the air delivery is factory matched for each speed tap for furnaces installed with or without an evaporator coil. Most installations, however, require modification of the factory settings to provide proper air delivery and this is done by changing the speed taps upon installation. Even if the motor speed is correct at installation, changes can occur within the system which require different motor settings to maintain the correct motor speed for the new conditions. These changed conditions can result from such causes as increased flow resistance due to dirty filters, closed ducts, reduced line voltage, and the increase in motor temperature. These changes cannot be controlled but they result in changes in the air delivery.

SUMMARY OF THE INVENTION

An electrically commutated motor (ECM) works off of a pulse input measured in percent of duty cycle and generates an RPM output signal characterized, for example, by thirty six pulses per rotation. To control an ECM so that it maintains appropriate air delivery for a specified air temperature rise or a given cooling load, a reference point has to be established. To do this, the CFM delivered must be calculated using the output from the ECM when set at a known duty cycle input. Knowing this reference point, the RPM necessary to obtain a desired CFM air delivery can be calculated. The microprocessor then adjusts the duty cycle input until the desired RPM is obtained. All system variations are then accounted for on each thermostat cycle.

It is an object of this invention to provide proper air delivery even when system conditions change.

It is another object of this invention to provide two stage heating (high/low) while maintaining the flow of combustion air at the optimum level. These objects, and others as will become apparent hereinafter, are accomplished by the present invention.

Basically, an ECM is energized and operated at an arbitrary pulse width say 50% for approximately 15 to 20 seconds to allow the motor RPM to stabilize. This RPM is then used to establish the necessary RPM for proper air delivery.

BRIEF DESCRIPTION OF THE DRAWINGS

For a fuller understanding of the present invention, reference should now be made to the following detailed description thereof taken in conjunction with the accompanying drawings wherein:

FIG. 4 shows how FIGS. 4A and 4B are related.

FIGS. 4A and 4B show a flow diagram of the motor control.

DESCRIPTION OF THE PREFERRED EMBODIMENT

Figure 1:
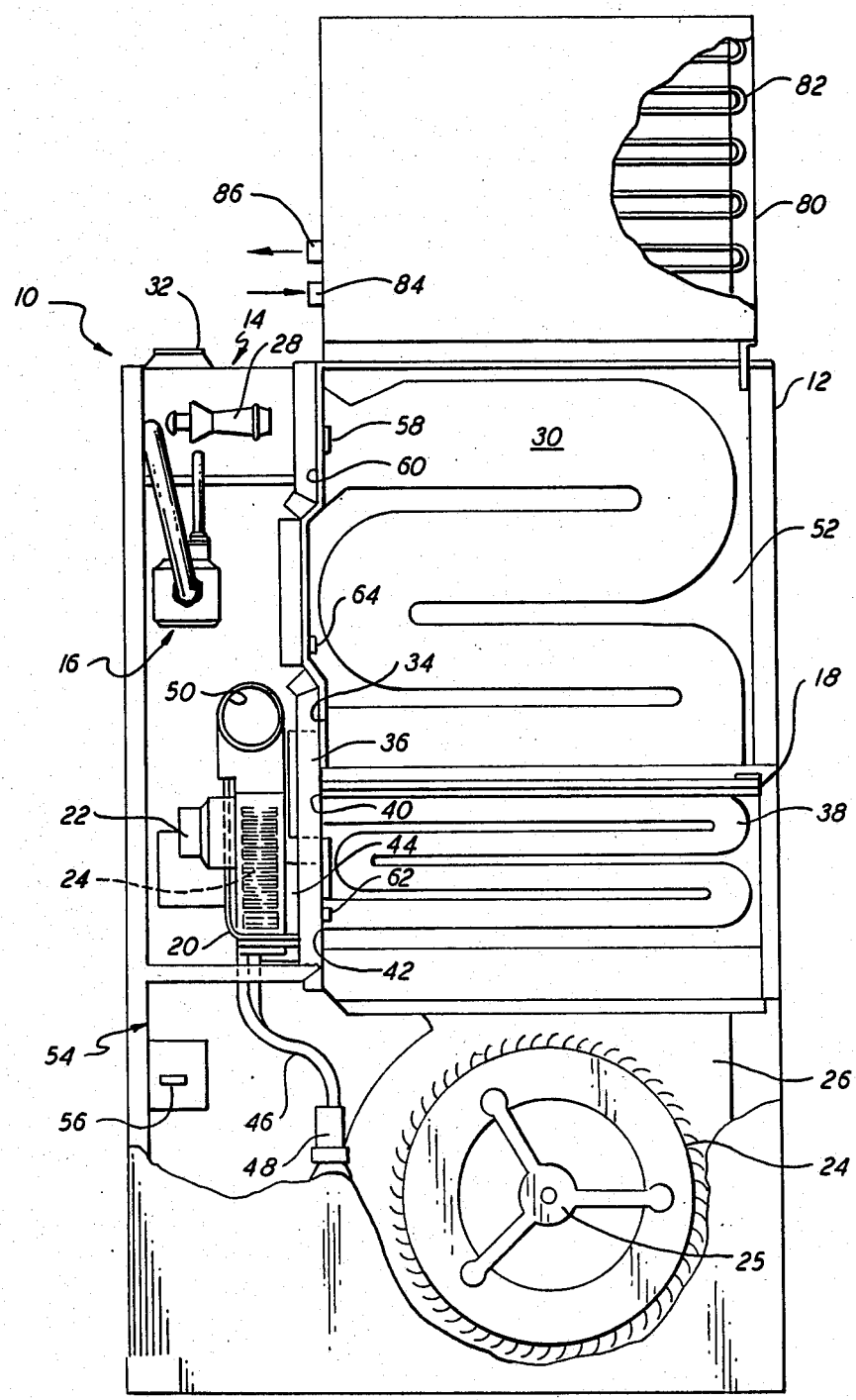
FIG. 1 is a partially cutaway side view of a condensing furnace having an evaporator coil and incorporating the principles of the present invention.

In FIG. 1, the numeral 10 generally designates a gas-fired condensing furnace employing the adaptive motor control of the present invention. Condensing furnace 10 includes a steel cabinet 12 housing therein burner assembly 14, combination gas control 16, heat exchanger assembly 18, inducer housing 20 supporting, inducer motor 22 and inducer wheel 24, and circulating air blower 26. Combination gas control 16 includes pilot circuitry for controlling and providing the pilot flame.

Burner assembly 14 includes at least one inshot burner 28 for at least one primary heat exchanger 30. Burner 28 receives a flow of combustible gas from gas regulator 16 and injects the fuel gas into primary heat exchanger 30. A part of the injection process includes drawing air into heat exchanger assembly 18 so that the fuel gas and air mixture may be combusted therein. A flow of combustion air is delivered through combustion air inlet 32 to be mixed with the gas delivered to burner assembly 14.

Primary heat exchanger 30 includes an outlet 34 opening into chamber 36. Connected to chamber 36 and in fluid communication therewith are at least four condensing heat exchangers 38 having an inlet 40 and an outlet 42. Outlet 42 opens into chamber 44 for venting exhaust flue gases and condensate.

Inducer housing 20 is connected to chamber 44 and has mounted thereon an inducer motor 22 together with inducer wheel 24 for drawing the combusted fuel air mixture from burner assembly 14 through heat exchanger assembly 18. Air blower 26 is driven by electronically commutated motor (ECM) 25 and delivers air to be heated in a counterflow arrangement upwardly through air passage 52 and over heat exchanger assembly 18. The cool air passing over condensing heat exchanger 38 lowers the heat exchanger wall temperature below the dew point of the combusted fuel air mixture causing a portion of the water vapor in the combusted fuel air mixture to condense, thereby recovering a portion of the sensible and latent heat energy. The condensate formed within heat exchanger 38 flows through chamber 44 into drain tube 46 to condensate trap assembly 48. As air blower 26 continues to urge a flow of air, upwardly through heat exchanger assembly 18, heat energy is transferred from the combusted fuel air mixture flowing through heat exchangers 30 and 38 to heat the air circulated by blower 26. Finally, the combusted fuel air mixture that flows through heat exchangers 30 and 38 exits through outlet 42 and is then delivered by inducer motor 22 through exhaust gas outlet 50 and thence to a vent pipe (not illustrated).

Cabinet 12 also houses microprocessor control assembly 54, LED display 56, pressure tap 58 located at primary heat exchanger inlet 60, pressure tap 62 located at condensing heat exchanger outlet 42 and limit switch 64 disposed in air passage 52. In a non-condensing furnace, pressure tap 62 would be disposed at primary heat exchanger outlet 34, since there would be no condensing heat exchanger 38.

Figure 2:
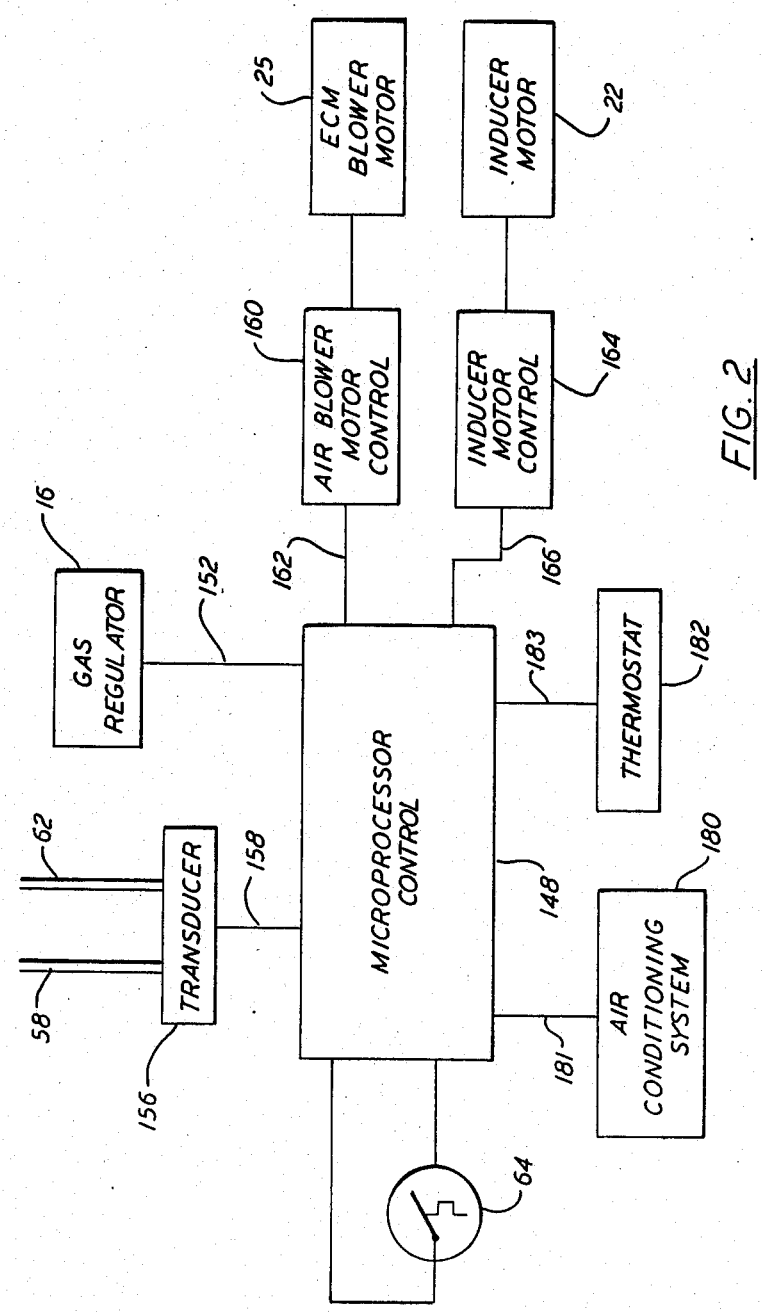
FIG. 2 is a block diagram of a portion of the furnace control system.

A cooling coil 82 is located in housing 80 on top of furnace cabinet 10 and is the evaporator of air conditioning system 180 which is schematically shown in FIG. 2. The cooling coil 82 has an inlet 84, where subcooled refrigerant enters, and an outlet 86, where superheated refrigerant leaves, as is conventional. In response to an input from heating/cooling thermostat 182, air blower 26 urges air flow upwardly through cooling coil 82 where heat exchange takes place. As a result of this heat exchange, cool air is delivered to the conditioned space and superheated refrigerant is returned to the outdoor condensing section (not illustrated) via outlet 86. In the outdoor condensing section the refrigerant is subcooled and returned to inlet 84. This cycle continues until the thermostat 182 is satisfied.

Referring now to FIG. 2, microprocessor control 148 is located in microprocessor control assembly 54 in condensing furnace 10 and is capable of being preprogrammed to generate a plurality of control signals in response to received input signals. The simplified block diagram illustrates the interconnection between microprocessor control 148 and pressure taps 58 and 62 through differential pressure transducer 156 which generates an analog signal indicative of the differential pressure. Microprocessor control 148 is also electrically connected to limit switch 64, to gas regulator 16 through electrical lines 152, to air blower motor control 160 of ECM 25 of air blower 26 through electrical lines 162, to inducer motor control 164 of inducer motor 22 through electrical lines 166, to air conditioning system 180 through electrical lines 181 and to thermostat 182 through electrical lines 183. Air blower motor control 160 and inducer motor control 164 respectively control the rate of fluid flow created by air blower 26 and inducer wheel 24. Ignition of the pilot control of gas regulator 16 and a signal is generated to microprocessor control 148 through electrical lines 152 to indicate that the flame is proved.

During this period of time, microprocessor control 148 is monitoring the pressure drop across heat exchanger assembly 18 through pressure taps 58 and 62 which transmit pressure readings to differential pressure transducer 156. Differential pressure transducer 156 sends a pressure differential signal indicative of the pressure drop across heat exchanger assembly 18 through electrical lines 158 to microprocessor control 148. After microprocessor control 148 determines that a sufficient pressure drop exists across heat exchanger assembly 18, that the gas pressure in gas regulator 16 is at or above a predetermined pressure, and the pilot flame has been proved, microprocessor control 148 is programmed to generate a voltage signal through electrical lines 152 to a solenoid (not illustrated) in regulator 16 for controlling gas flow.

Gas flow is provided by gas regulator 16 to burner assembly 14 and the fuel air mixture is combusted by inshot burner 28.

The combusted fuel air mixture is then drawn through heat exchanger assembly 18 and out exhaust gas outlet 50 by the rotation of inducer wheel 24 by motor 22. After a preselected period of time, for example, one minute, to ensure that heat exchanger assembly 18 has reached a predetermined temperature, microprocessor control 148 is preprogrammed to generate a signal through electrical lines 162 to air blower motor control 160, which starts ECM 25 of air blower 26 to provide a flow of air to be heated over condensing heat exchanger 38 and primary heat exchanger 30. Any condensate that forms in condensing heat exchanger 38 is delivered through drain tube 46 to condensate trap assembly 48. After the heating load has been satisfied, the contacts of the thermostat 182 open, and in response thereto microprocessor control 148 de-energizes gas regulator 16 ceasing the supplying of fuel. This naturally causes the pilot flame and burner flame to be extinguished.

After gas control 16 is de-energized, microprocessor control 148 generates a signal over electrical lines 166 to inducer motor control 164 to terminate operation of inducer motor 22. After inducer motor 22 has been de-energized, microprocessor control 148 is further preprogrammed to generate a signal over lines 162 to air blower motor control 160 to de-energize ECM 25, thereby terminating operation of air blower 26, after a preselected period of time, for example, 60-240 seconds. This continual running of air blower 26 for this predetermined amount of time permits further heat transfer between the air to be heated and the heat being generated through heat exchanger assembly 18, which also naturally serves to cool heat exchanger assembly 18.

Because the pressure drop across heat exchanger assembly 18 can vary due to changing conditions or parameters, microprocessor control 148 is preprogrammed to ensure an optimum manifold gas pressure as a function of the amount of combustion air flowing through combustion air inlet 32 under the influence of inducer wheel 24. The pressure drop across heat exchanger assembly 18 is measured by pressure taps 58 and 62 which transmit their individual pressure readings to differential pressure transducer 156. Transducer 156 then generates a pressure differential signal to microprocessor control 148 over electrical lines 158 indicative of the pressure drop across heat exchanger assembly 18. An empirically determined equation for optimum manifold gas pressure versus heat exchanger pressure drop is programmed into microprocessor control 148 whereby it determines the optimum manifold gas pressure for a particular pressure drop across heat exchanger assembly 18, as indicated by the pressure differential signal received from differential pressure transducer 156. As the pressure drop varies, microprocessor control 148 generates a signal to gas regulator 16 over electrical lines 152 to regulate the fuel supply. During continued operation of furnace 10, microprocessor control 148 continues to make adjustments in the gas flow rate and pressure as a function of certain variable parameters, such as line pressure, dirty filters, closed ducts, supply voltage, temperature changes, vent pipe length, furnace altitude, and the like. Thus, gas control 16 and microprocessor control 148 provide essentially an infinite number of gas flow rates between a zero flow rate and a maximum flow rate in a selected range of, for example, two inches to fourteen inches W.C. (water column).

Determination of insufficient or too much combustion air flowing through combustion air inlet 32 is determined by the pressure drop across heat exchanger assembly 18. This pressure drop is measured by pressure taps 58 and 62 and a signal is generated in response thereto by differential pressure transducer 156 to microprocessor control 148. Generally, for each pressure differential value, there is one optimum manifold gas pressure and one optimum combustion air flow rate. Thus, assuming the manifold gas pressure is substantially constant, variations in certain parameters can require adjustment to the combustion air flow rate as provided by inducer wheel 24.

Upon determining insufficient combustion air flow through burner assembly 14, as indicated by a low pressure drop across heat exchanger assembly 18, microprocessor control 148 generates a speed increase signal to inducer motor control 164 to increase the combustion air flow rate through burner assembly 18 and increase the pressure drop across heat exchanger assembly 18. In a similar manner, microprocessor control 148 can determine insufficient flow of air to be heated through furnace 10 by activation of temperature limit switch 64 which will open when the temperature in air passage 52 exceeds a predetermined temperature limit.

The cooling function is achieved by air conditioning system 180, which is controlled by microprocessor control 148 responsive to the thermostat 182. ECM 25 and air blower motor control 160 are common to both the heating and cooling function for driving air blower 26. Except for ECM 25 and air blower motor control 160 and their operation, the air conditioning system 180 operates in a conventional fashion.

From the foregoing description, it is clear that the ECM 25 must be accurately controlled by microprocessor control 148 to optimize operation of furnace 10 and air conditioning system 180. To achieve the necessary control, it is necessary to have a calibrated response. An ECM 25, such as is available from General Electric as part number 5SME39HGH69IT, varies speed with a change in percent duty cycle and air blower motor control 160 generates an RPM output signal of 36 pulses per revolution. To control ECM 25 so that it maintains an appropriate air delivery for a specified air temperature rise or for, a given cooling load, a reference RPM and CFM must be established.

Figure 3:
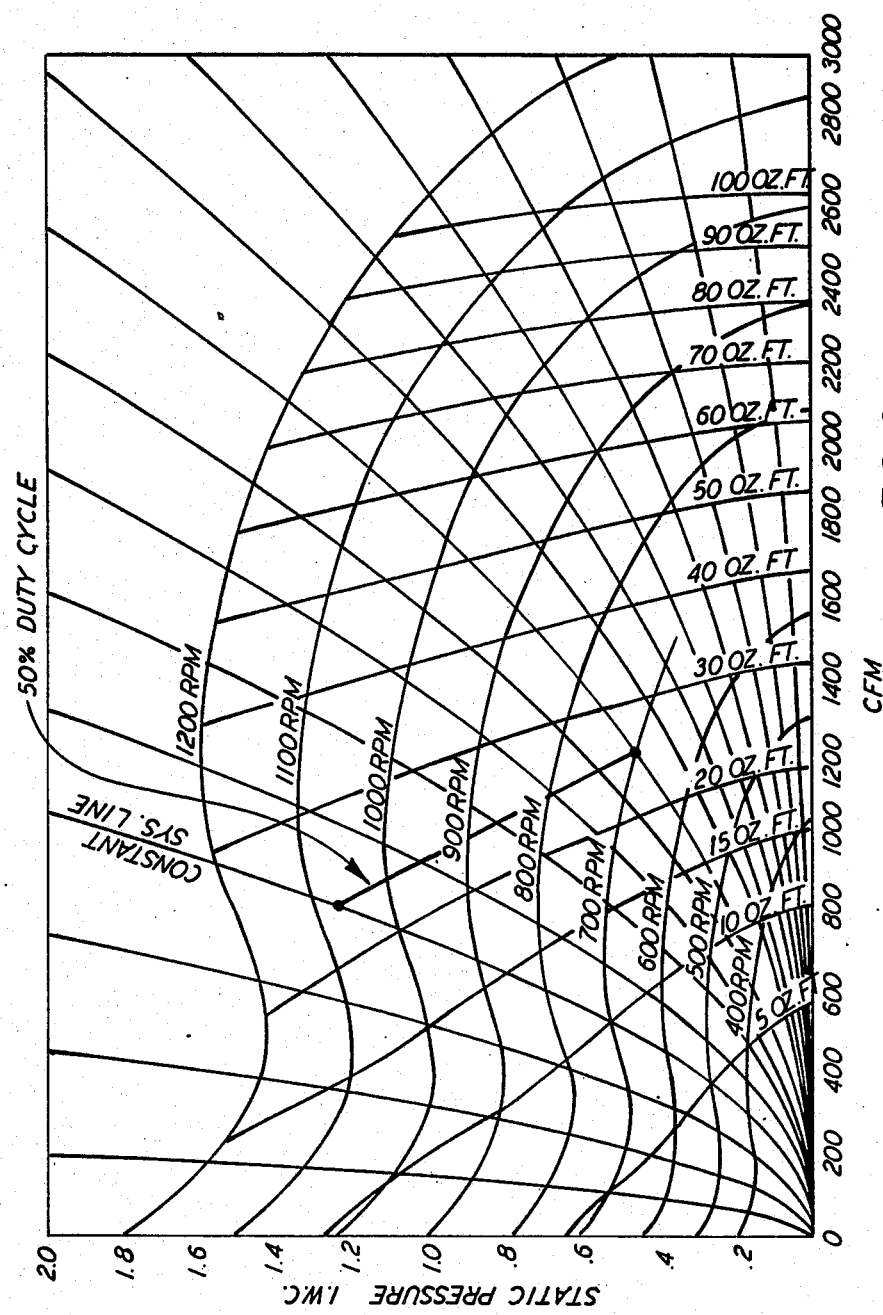
FIG. 3 is a standard fan curve for static pressure in inches of water column (I.W.C.) vs. CFM at various torques in ounce feet and RPMs.

The fan curves illustrated in FIG. 3 are used in conjunction with the procedure set forth in FIG. 4A and 4B. As indicated by box 200, the ECM blower motor 25 is turned on in response to a blower on signal in response to a sensed temperature deviation by thermostat 182 and, as indicated by box 202, the air blower motor control 160 is initially set at a predetermined, arbitrary, 50% duty cycle by microprocessor control 148 for 20 seconds. Because ECM motor 25 generates an RPM output signal characterized by thirty six pulses per rotation, the RPM at the 50% duty cycle can be read out directly from motor control 160 as indicated by box 204. Knowing the RPM, the CFM can be calculated, as indicated by box 206, from equation (1).

$$CFM = 2161.24 - [(1.212)(RPM)] \qquad (1)$$

With a known RPM and CFM we can now locate a point on FIG. 3 which locates the constant system line for a 50% duty cycle. When the constant system line is located, the desired RPM, $RPM_{DES}$, which delivers the desired CFM, $CFM_{DES}$, can be determined directly from FIG. 3 or can be calculated as indicated in box 218, from equation (2), the fan law equation:

$$RPM_{DES} = RPM \, (CFM_{DES}/CFM) \qquad (2)$$

As indicated by box 208, responsive to the temperature in the area to be conditioned and the thermostatic setting, the microprocessor control sets the system in either a heating or a cooling mode. Assuming first a heating mode, box 210, a decision must then be made by microprocessor control 148, as indicated by box 212, as to whether the system should be in the low heat or high heat mode. The major difference between high and low heat is the different $CFM_{DES}$ air delivery that passes around the heat exchangers 30 and 38. With the lesser amount of air being circulated in the low heat mode, a $CFM_{DES}$ of 667 CFM is to be achieved, as indicated by block 214, while in the high heat mode with the greater amount of air being circulated a $CFM_{DES}$ of 1234 CFM is to be achieved, as indicated by box 216. It should be noted that more heat is removed from the heat exchangers in the high heat mode due to the increased air flow which is necessary because of the increased gas input rate.

If the system is in cooling mode, as indicated by box 220, the mode must be selected by microprocessor control 148 from 2 tons, 2½ tons or 3 tons of cooling, as indicated by box 222. The three cooling modes have respective desired CFM outputs, ($CFM_{DES}$) of 800, 1000 and 1200 as indicated by boxes 224, 226, and 228. With the desired heating CFM from box 214 or 216 or from one of the cooling modes indicated by boxes 224, 226, or 228 as an input, the desired motor speed ($RPM_{DES}$) is calculated, as indicated by box 218, from equation 2 where RPM is the initial RPM from box 204 and CFM is the initial CFM from box 206. With $RPM_{DES}$ calculated, the RPM is read and called $RPM_{ACT}$ as indicated by box 230. The motor control 160 is then incremented or decremented one step if $RPM_{ACT} \neq RPM_{DES}$ as indicated by box 232. After this, it is necessary to determine whether the system is in the high heat mode, as indicated by box 234. If the system is not in the high heat mode, it is necessary to determine if high heat is desired, as indicated by box 236, and, if so, the logic returns to box 216. If it is determined in box 234 that the system is in high heat, or if it is determined in box 236 that high heat is not desired, it is then necessary to determine whether or not the thermostat is satisfied, as indicated by box 238. If the thermostat is not satisfied, the logic returns to box 230 where $RPM_{ACT}$ is read again. This logic continues to repeat itself until the thermostat is satisfied. When the thermostat is satisfied the microprocessor control checks to see if the system is in either a heating or cooling mode as indicated by box 240. Assuming first a heating mode, as indicated by box 242, the heating gas supply is shut off and the off delay timer is started, as indicated by box 244, $RPM_{ACT}$ is read, as indicated by box 246, then motor controller 160 is incremented or decremented if $RPM_{ACT} \neq RPM_{DES}$ as shown in box 248, this is done so that the residual heat will be delivered from the heat exchanger to the area to be conditioned. If it is determined in box 252 that the timer has not timed out the logic returns to box 246 where $RPM_{ACT}$ is read again. This logic continues to repeat itself until the timer times out. The blower motor is then shut off as indicated in box 252. If the system is in cooling mode as indicated by box 250 the blower motor is then shut off as shown in box 254. No delay off time is necessary in the cooling mode.

It should be noted that in the foregoing description that the motor control was set at a 50% duty cycle at box 202 and that the motor controller speed input signal was incremented or decremented at box 232. In achieving this change, there is a change in $RPM_{ACT}$. This process is then repeated until $RPM_{ACT} = RPM_{DES}$.

If any system variations occur, each thermostat cycle allows the program to compensate for the change in load which is indicated by a change in RPM at box 204, which results in a change in CFM at box 206. Ultimately this system change either increases or decreases $RPM_{DES}$ so the proper air delivery is provided.

This process is illustrated using the FIG. 3 diagram by taking the steps of boxes 202, 204 and 206 which gives the 50% duty cycle point for the determined RPM and CFM and this locates a constant system line.

By following the constant system line to where, it intersects the desired CFM line, one can determine the desired RPM.

This process also requires manual calibration of the ECM motor 25 and ECM control 160 to achieve a constant CFM air delivery. Calibration is necessary because of the inconsistencies with electronic components and motor magnet strength.

Although a preferred embodiment of the present invention has been illustrated and described, changes will occur to those skilled in the art. It is therefore intended that the scope of the present invention is to be limited only by the scope of the appended claims.

What is claimed is:

1. An adaptive motor control for regulating an ECM driven circulating air blower for each thermostat cycle comprising the steps of:

sensing the temperature in an area to be conditioned;
   comparing the sensed temperature to a predetermined set point;
   if the sensed temperature deviates from the predetermined set point by more than a predetermined amount, operating the ECM at a predetermined duty cycle for a sufficient time for stabilization;
   determining the RPM:
   determining the CFM:
   determining whether heating or cooling is required;
   if heating is required, determining whether high or low heat is required;
   if cooling is required, determining the amount of cooling required:
   selecting the desired CFM for the required heating or cooling;
   determining the desired RPM for the selected desired CFM;
   determining the actual RPM;
   adjusting the speed of the ECM if the actual and desired RPM are not the same;
   determining whether the thermostat is satisfied;
   if the thermostat is not satisfied, returning to the step of determining the actual RPM;
   if the thermostat is satisfied, determining whether the system is in the heating or cooling mode,
   if in the cooling mode, shutting off the blower; and;
   if in the heating mode, shutting off the gas and then shutting off the blower after a predetermined time.

2. The adaptive motor control of claim 1 further including the step of continuing to adjust the speed of the ECM if the actual and desired RPM are not the same until the blower is shut off.

* * * * *